United States Patent [19]

Hake

[11] Patent Number: 5,245,601

[45] Date of Patent: Sep. 14, 1993

[54] OPTICAL RECORDER AND/OR PLAYER INCLUDING CLEANING MEANS

[75] Inventor: Martin Hake, Villingen-Schwenningen, Fed. Rep. of Germany

[73] Assignee: Deutsche Thomson-Brandt GmbH, Villingen-Schwenningen, Fed. Rep. of Germany

[21] Appl. No.: 688,500

[22] PCT Filed: Nov. 21, 1989

[86] PCT No.: PCT/EP89/01413

§ 371 Date: Jun. 19, 1991

§ 102(e) Date: Jun. 19, 1991

[87] PCT Pub. No.: WO90/06576

PCT Pub. Date: Jun. 14, 1990

[30] Foreign Application Priority Data

Nov. 30, 1988 [DE] Fed. Rep. of Germany ....... 3840311

[51] Int. Cl.⁵ .................. G11B 33/14; G11B 7/00; G02B 7/02
[52] U.S. Cl. ........................ 369/72; 369/71; 15/316.1; 359/509
[58] Field of Search ........ 369/72, 71; 15/316; 359/509

[56] References Cited

U.S. PATENT DOCUMENTS 4,581,668 4/1986 Campbell ............................ 369/72

FOREIGN PATENT DOCUMENTS 45537 2/1982 European Pat. Off. .
65954 4/1984 Japan .
154626 9/1984 Japan .
127540 7/1985 Japan .................. 369/72
224151 10/1986 Japan .
224190 10/1986 Japan .................. 369/72
280043 12/1986 Japan .
24448 2/1987 Japan .
52785 3/1987 Japan .................. 369/72
217584 9/1988 Japan .................. 369/72
255839 10/1988 Japan .
13235 1/1989 Japan .
162240 6/1989 Japan .

OTHER PUBLICATIONS

Ryokichi Hattori, "Optical Disk..." *Pat. Abs. of Japan*, vol. 13, No. 70, p. 829 (Feb. 17, 1989) (effective date Oct. 1988) 255839.

Norio Hashimoto, "Optical...,*Pat. Abs. of Japan*", vol. 12, No. 408, p. 778 (Oct. 28, 1988) (effective date Jun. 1988) 291594.

Yasuhis Fukushima, "Dust ... " 22228 (Mar. 1981) (abstract only).

Ryoki Taki, "Optical....", *Pat. Abs. of Japan*, vol. 12, No. 396, p. 774 (Oct. 21, 1988) (effective date Jun. 1988) 136371.

*Primary Examiner*—Jon W. Henry
*Attorney, Agent, or Firm*—Max Fogiel

[57] ABSTRACT

An optical recording and/or reproducing apparatus includes a recording and/or scanning device fitted with a lens. A current of air which blows away dust that would otherwise impair the quality of reproduction can be directed over the lens by ribs on the underside of a turntable.

4 Claims, 2 Drawing Sheets

OPTICAL RECORDER AND/OR PLAYER INCLUDING CLEANING MEANS

BACKGROUND OF THE INVENTION

Operation of equipment of this type, compact-disk players in particular, has demonstrated that dust on the surface of the lens in the pickup system can considerably decrease the scanning quality, which expresses itself for example in poorer music reproduction.

Accumulated dust will even deteriorate reproduction in analog-record players that mechanically scan an audio track with a stylus. The VR15 cartridge manufactured by Shure Brothers accordingly featured a tiny brush that swept a number of adjacent grooves free of dust in advance of the stylus.

Also known was an approach wherein the stylus traveled over a small brush as the pickup arm moved toward or away from its rest, brushing dust off the stylus. This device was manufactured by Elac, Kiel.

A device for blowing away and/or suctioning up small particles while records were being played by the AEG-Telefunken TED process was also known.

Reducing or eliminating detrimental deposits of dust particles on the surface of the lens of the optical system in equipment of the type initially described herein was the object of the present invention.

The invention makes it possible with appropriate means to decrease or prevent the deposit of dust on the surface of the lens in an optical recording and/or playback mechanism.

BRIEF DESCRIPTION OF THE DRAWINGS

Two embodiments of the invention will now be specified with reference to the drawing, wherein.

DESCRIPTION OF THE PREFERRED EMBODIMENTS

Figure 1:
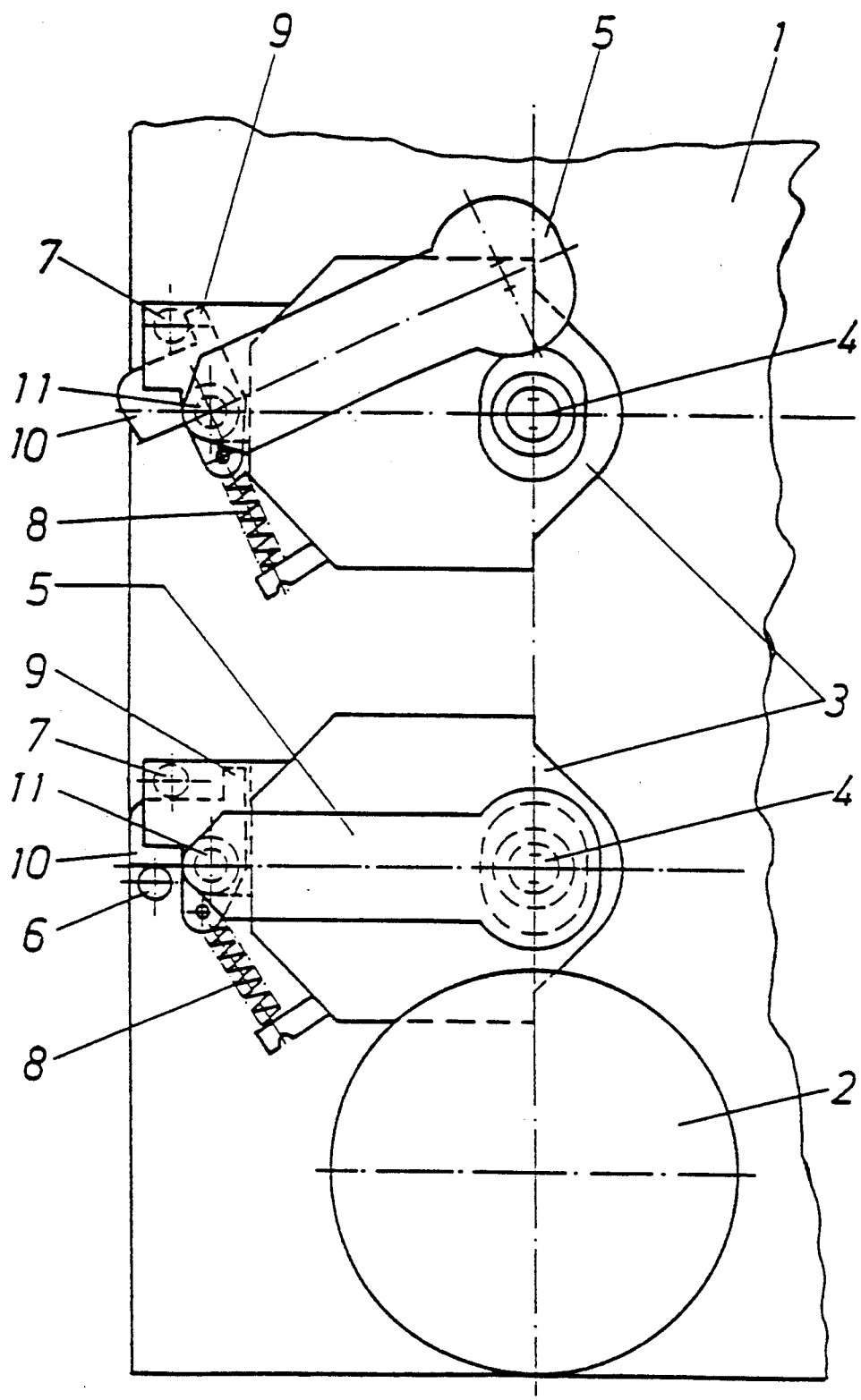
FIG. 1 is a highly simplified top view of a lens cap mechanically activated by the recording and/or playback mechanism and FIG. 2 is a top view illustrating the principle of a blower that aims a jet of air over the surface of the lens.

FIG. 1 illustrates a mechanical device activated by a recording and/or playback mechanism 3 as it moves into its disengaged or farthest-out position next to a turntable 2. Recording and/or playback mechanism 3 is also illustrated in a position within its range of operation, whereby a lens 4 is exposed by a pivoting lid 5 as it swings counterclockwise subject to the force of a tension spring 8 and encounters a stop 7 on an arm 9 of pivoting cap 5. As a radial drive mechanism shifts recording and/or playback mechanism 3 back into the disengaged position, pivoting cap 5 swings clockwise into the illustrated position, covering lens 4 and protecting it from dust. The swing occurs against the force of tension spring 8 once recording and/or playback mechanism 3 has forced another arm 10 on pivoting cap 5 against a stop 6 secured to the chassis or base plate 1. The component with arms 9 and 10 is rigidly attached to pivoting cap 5 and pivots around an axis 11. The drawing is approximately twice actual size.

Figure 2:
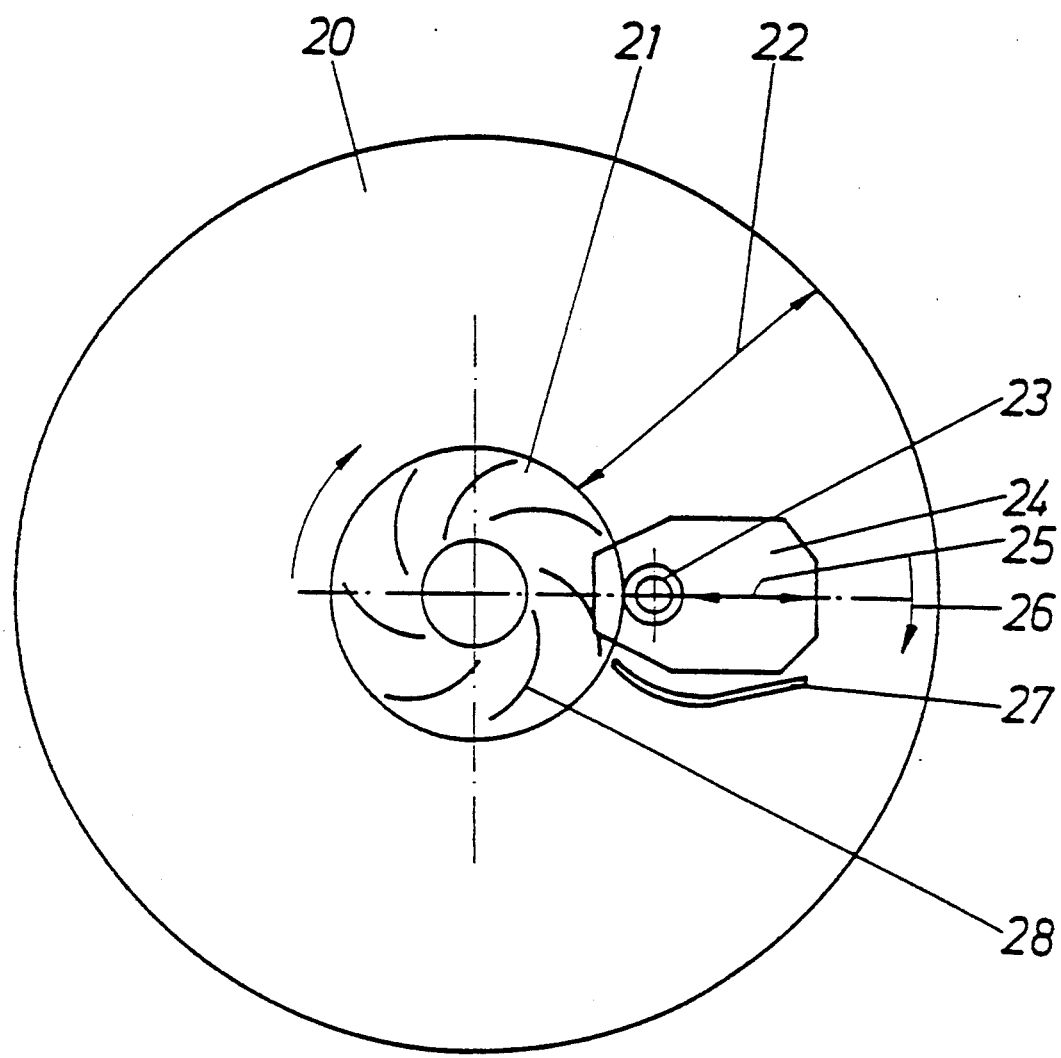

FIG. 2 is approximately actual size and illustrates a device that generates a jet of air aimed over the surface of the lens. The illustrated compact disk 20 is to be considered transparent, as is the turntable 21 below it, which has curved ribs 28. As turntable 21 spins in the direction indicated by arrow 26, the ribs generate a jet of air that is aimed by a baffle 27 over the surface of lens 23 on the top of recording and/or playback mechanism 24. The arrow 25 facing in the opposite direction represents the radial motion of recording and/or playback mechanism 24 during playback. The radial double-headed arrow 22 indicates the scanning range.

I claim:

1. An optical recorder and/or player for playing an information-storage medium in form of a disk, comprising: a lens and means for maintaining the surface of said lens free of dust; a turntable and a motor for driving said turntable, said turntable rotating said disk; said turntable having a side not rested on by said disk said side having ribs for generating a jet of air; and baffles for deflecting said jet of air over the surface of said disk.

2. An optical recorder and/or player as defined in claim 1, including a recording and/or playback mechanism; controls acting on said mechanism to ensure that said lens will be cleaned when a user turns off said recorder and/or player or activates ready-to-play, repeat, or pause modes before and/or after phases of activation on part of said mechanism.

3. An optical recorder and/or player as defined in claim 1, including a power-supply plug and energy-storage means for supplying energy to clean said lens when said power-supply plug is accidentally removed from an outlet or when a power failure occurs.

4. An optical recorder and/or player as defined in claim 1, including a recording and/or playback mechanism; a timer for ensuring that said mechanism will arrive in a disengaged and cleaning position before an external power supply is discontinued.

* * * * *